Oct. 5, 1965
R. SCHARDT
3,209,623
PNEUMATIC POSITIONING TABLE
Filed Oct. 15, 1962
3 Sheets-Sheet 1
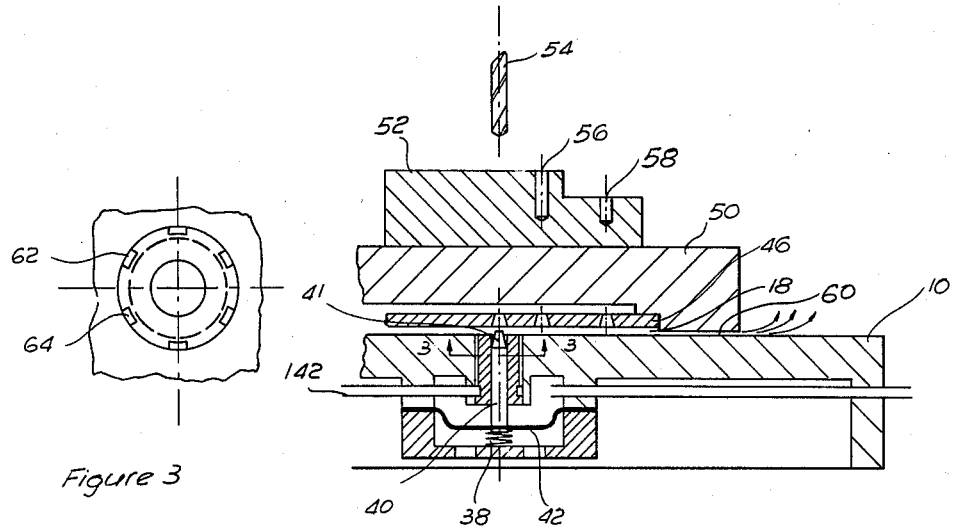
Figure 3
Figure 2
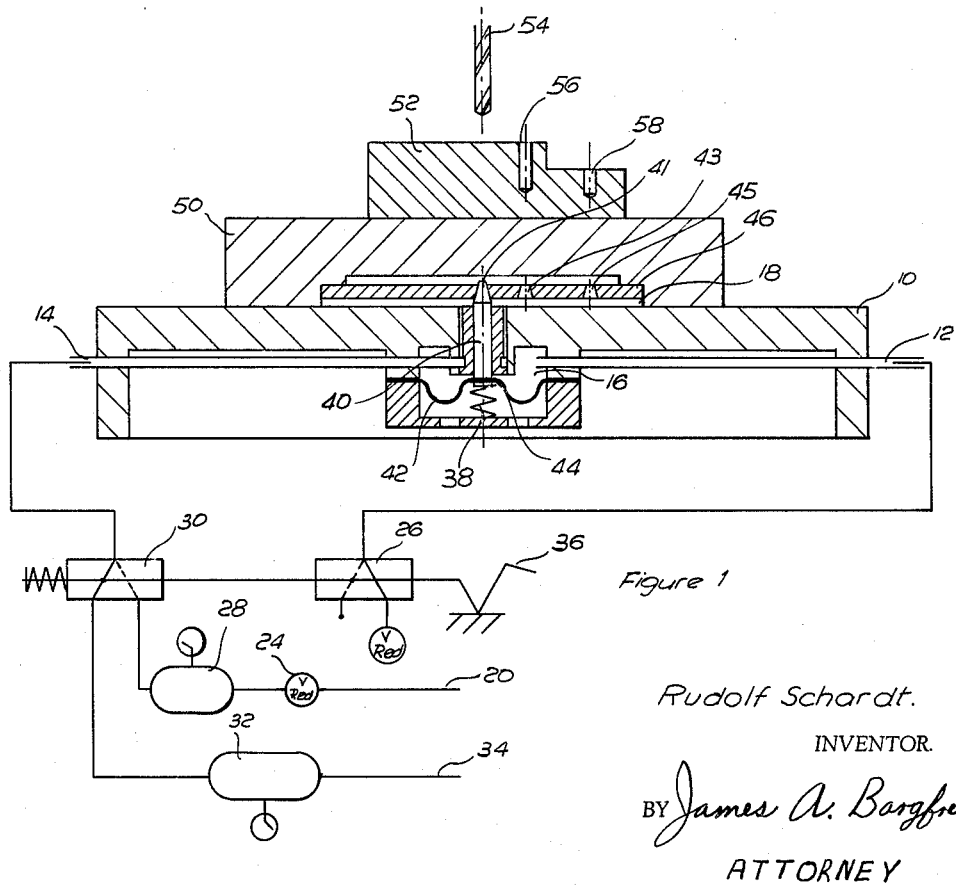
Figure 1
Rudolf Schardt.
INVENTOR.
BY James A. Bargfrede
ATTORNEY Rudolf Schardt.
INVENTOR.

BY James A. Bargfrede
ATTORNEY

Oct. 5, 1965   R. SCHARDT   3,209,623
PNEUMATIC POSITIONING TABLE
Filed Oct. 15, 1962   3 Sheets-Sheet 3
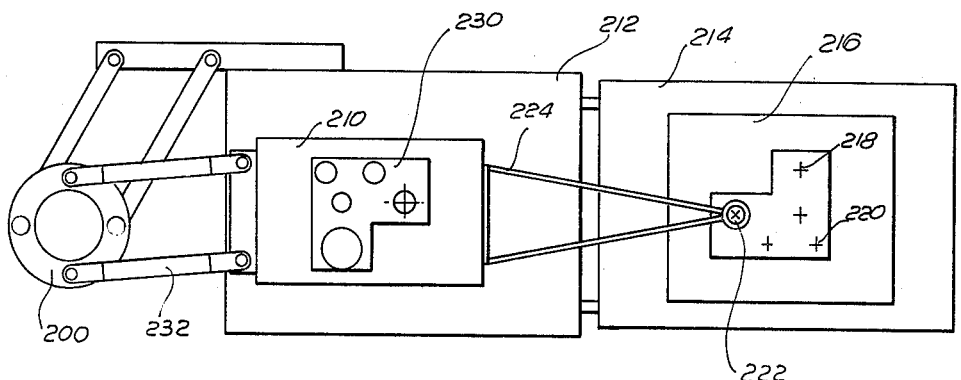
Figure 7
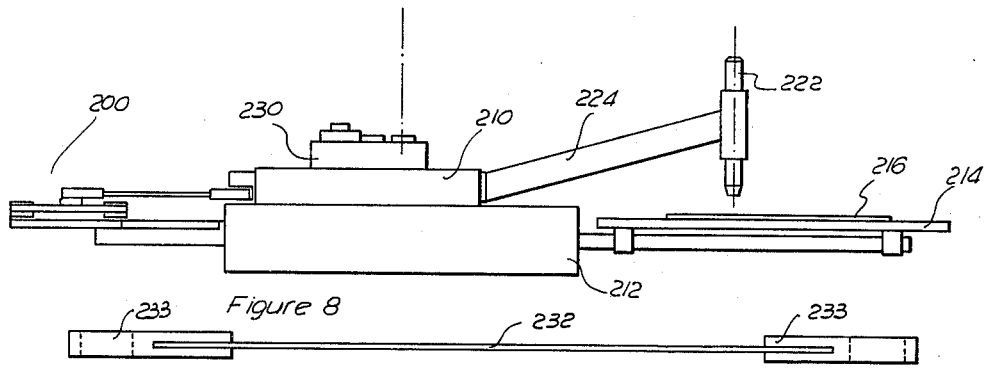
Figure 8
Figure 9
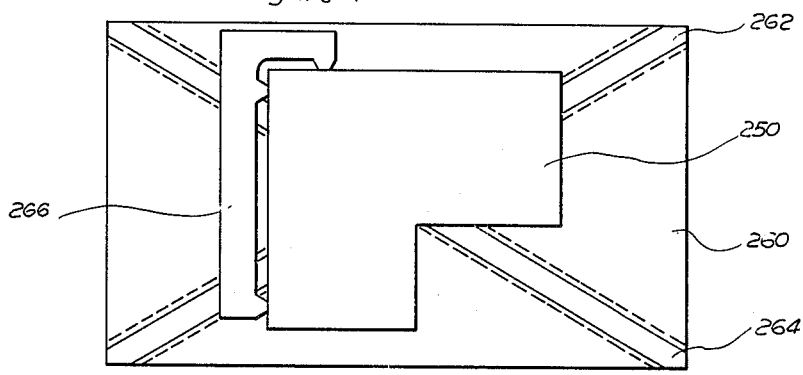
Figure 10
Rudolf Schardt.
INVENTOR.
BY James A. Bargfrede
ATTORNEY

United States Patent Office 3,209,623
Patented Oct. 5, 1965

3,209,623
PNEUMATIC POSITIONING TABLE
Rudolf Schardt, 3510 Laverne, Houston, Tex.
Filed Oct. 15, 1962, Ser. No. 230,353
4 Claims. (Cl. 77—64)

This invention pertains generally to machine tools and particularly to positioning devices which may be used as components of machine tools.

In the machine tool art and particularly in machine shops, drill jigs which are used to accurately locate and guide a drill or similar cutting tool on a work piece for the purpose of material removal present a costly and time consuming problem. Such jigs require precision in the construction of component parts and therefore highly skilled personnel are required for constructing and maintaining the jigs in operable condition. For many years improved methods and means for rapidly and inexpensively indexing or positioning work pieces with relation to the cutting tool have been elusive problems.

Also, in known positioning devices time consuming effort has been required for locking the jigs to properly position the work piece relative to the cutting tool. Known locking apparatus has left much to be desired in the way of simplicity, low cost, reliability, and distortion due to locking forces.

Thus, it is an object of the present invention to provide improved positioning apparatus.

Another object of the present invention is to provide positioning apparatus and methods which incorporate vacuum locking means.

Still another object of the present invention is to provide positioning apparatus which has a wide range of use with regard to the weight of the work piece being positioned at great accuracy and extreme ease.

A still further object of the present invention is to provide positioning means which allow a work piece to be moved friction free while providing that the work piece will be rigidly locked in position after a desired location has been selected.

In the drawings

FIGURE 1 is a cross-sectional, elevational view and schematic of the invention showing the positioning table in a locked condition;

FIGURE 2 is a cross-section, elevational view of a portion of the positioning table shown in FIGURE 1 when the locking means is in an unlocked condition;

FIGURE 3 is a plan view taken along line 3—3 of FIGURE 2;

FIGURE 7 is a plan view showing a pantograph and microscope attachment incorporating the present invention;

FIGURE 8 is an elevational view of the pantograph and microscope attachment shown in FIGURE 7;

FIGURE 9 is an elevational view showing the upper pantograph arm; and

FIGURE 10 is a plan view of the work table and work piece utilized in FIGURES 7 and 8.

Figure 4:
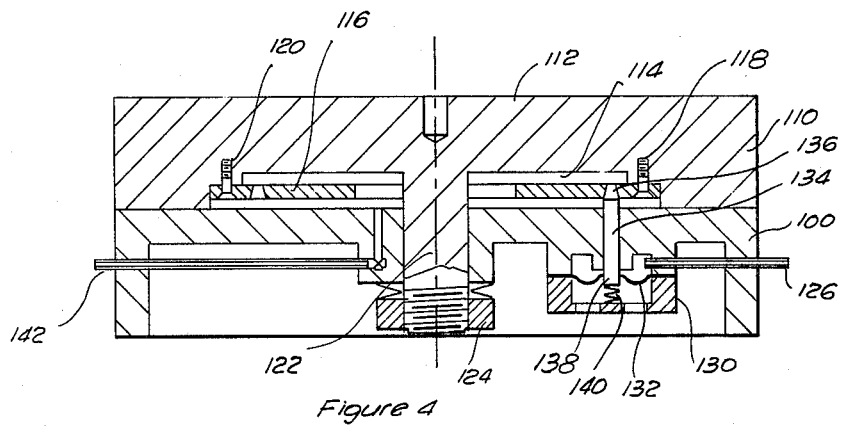
FIGURE 4 is a cross-sectional, elevational view of a rotary indexing table showing the positioning means of the present invention in a locked position.

In practicing the invention positioning apparatus are provided for positioning a work piece in relation to a tool and then locking the work piece after the selected positioning has occurred. The positioning and locking means of the present invention may include a base, a work table, a plunger, a template, a source of compressed air and controls therefor, and a controlled vacuum. The base provides a flat top surface and a plunger assembly may be located in the center of the base. The plunger is spring loaded so that it projects above the base surface and the plunger is connected to a diaphragm assembly inside the base. The projecting portion of the plunger may be tapered or of other suitable shape for ease of registering with the holes in the template. An air inlet in the diaphragm chamber enables air pressure to retract the plunger below the base surface for positioning the table. When the air pressure is removed from the diaphragm chamber, the spring will return the plunger against the template surface. The work table then is moved until the plunger drops into another hole in the template. A plurality of air holes are located around the plunger and it is through these holes that low pressure air is supplied below the work table for the purpose of floating the work table on a film of air. The air pressure may be adjustable since the required pressure depends on the work piece weight and area of the work table. The template is carried in a recess under the work table and the hole pattern required on the work piece is laid out on the template. Holes of proper size are provided in the template so that the spring loaded plunger can register without any play, thereby locating the work table with the work piece accurately for each operation. Once the work table is located, a vacuum may be drawn under the work table to secure the table against any shifting during the working operation. In certain instances vacuum may not be necessary when the torque created by the working tool on the work piece is relatively small. An alternate arrangement of the present invention utilizes a pantograph and microscope attachment whereby the template may be eliminated by working directly off of an accurate drawing. When the pantograph and microscope attachment is used a drawing table is fastened to the base. A pantograph connects the work table to the base. A support on the work table receives a microscope of the desired power with a cross air reticle. The hole centers on the drawing are sighted through the microscope and the work table is properly positioned and vacuum locked prior to the operation on the work piece. A black anodized aluminum sheet or any other stable material of suitable characteristics may have the hole pattern laid out thereon and may be used instead of a drawing where greater accuracy is required.

Referring now to the drawings in detail, FIGURE 1 is a combined schematic and cross-sectional elevational view of one embodiment of the present invention. A base assembly 10 has two openings 12 and 14. Through opening 12 gas pressure provides control of the plunger through diaphragm 42. Opening 14 offers access to the chamber provided by cavity 18 when the work table rests on the top surface of base assembly 10. A gas pressure source 20 to a plunger control valve 26 and a low pressure air tank 28, respectively. The gas pressure source may be a pneumatic source such as the shop air supply found in most machine shops.

The low pressure air tank 28 is coupled to valve 30. Also coupled to valve 30 is a vacuum tank 32 which is coupled to a vacuum pump through vacuum inlet 34. Actuator 36 is coupled to the plunger control valve 26 and to the table float and lock valve 30. The actuator may be a foot pedal or other suitable apparatus which is convenient for the particular operation being performed.

The central portion of base 10 includes plunger means. The plunger means include resilient means 38, plunger 40, and diaphragm 42. Resilient means 38 may be a spring suitably coupled to a portion of the base and couples to one end 44 of the plunger 40. Diaphragm 42 is disposed intermediate the resilient means 38 and also coupled to end 44 of plunger 40. The other end 41 of plunger 40 is tapered to fit into a plurality of locating holes such as holes 43 and 45 which are in a template 46. Template 46 is positioned in a recess of work table 50. Work table 50 has work piece 52 positioned thereon and work piece 52 may be machined with a suitable tool 54 to provide holes 56 and 58.

FIGURE 1 shows the work piece 52 in position for tool 54 to penetrate the work piece. Such work piece has been aligned by the plunger 40 which has engaged one of the holes in template 46. FIGURE 1 shows the work table in a locked position which has been created by the application of a vacuum between work table 50 and base 10.

FIGURE 2 shows a portion of the base and table assembly of FIGURE 1 with FIGURE 2 showing work table 50 in a floating position. Gas pressure has been applied through inlet 12 to cause diaphragm 42 to move downwardly and overcome the force of resilient means 38. The downward movement of diaphragm 42 causes plunger 40 to be retracted so that the tapered end 41 is not in engagement with the template 46. Simultaneously low pressure air enters chamber 18 through inlet 14. Gas escapes through the space 60 between the work table 50 and base 10. Thus, when gas pressure is applied to the apparatus of the present invention, a floating effect occurs on the work table so that it may be positioned on the base in a frictionless manner. The amount of pressure necessary for separating the worktable from the base is dictated, of course, by the weight of the work piece 52 and the contact area of work table 50.

FIGURE 3 is a plan view taken along line 3—3 of FIGURE 2. A plurality of ports such as ports 62 and 64 allow communication between chamber 18 and the low pressure source or the vacuum source, depending on the position of valve 30.

Thus, actuator 36 shown in FIGURE 1 provides control of the gas pressure applied to diaphragm chamber 16 and chamber 18 to float the work table 50 relative to base 10. Actuator 36 has three operating positions. At full actuation, valves 26 and 30 are operated. Valve 26 actuates diaphragm 42 thereby retracing plunger 40. Simultaneously, valve 30 supplies chamber 18 with low gas pressure, lifting work table 50 and causing it to slide on an air film on the upper surface of base 10. At intermediate actuation of actuator 36, diaphragm pressure is exhausted to atmosphere and plunger 40 slides on the face of template 46 due to force exerted by resilient member 38 until it drops into the next locating hole provided in template 46. Due to low friction of the gas bearing provided by escaping gas at the interface of the work table 50 and upper surface of base 10, the plunger 40 locates table 50 with ease and great accuracy. After proper location is obtained actuator 36 is returned to a basic position where valve 30 has switched from low pressure gas supply to vacuum supply, thus locking the work table firmly to the base.

FIGURE 4 is a cross-sectional, elevational view of an embodiment of the invention for a rotary indexing table. Base 100 has mounted thereon a work table 110. A work piece has been eliminated from FIGURE 4 but it is obvious that a work piece can be mounted on surface 112 of work table 110.

Work table 110 has a chamber 114 therein and chamber 114 has a template 116 mounted on the work table 110 by suitable fasteners such as screws 118 and 120. Work table 110 is held in the base but free to move through a centering shaft 122 which may or may not be an integral part of work table 110. The lower portion of centering shaft 122 has a spring and a nut combination 124 to allow the work table 110 to have slight vertical movement. As described previously, FIGURE 4 has a gas pressure inlet 126 which is coupled to plunger means 130 of the base 100. Plunger means 130 includes a diaphragm 132 coupled to a plunger 134. Plunger 134 has a tapered end 136 for free movement into the template 116. End 138 of plunger 134 has resilient means 140 coupled thereto so that diaphragm 132 is disposed intermediate the resilient means 140.

As in the previously described embodiment of the invention, gas pressure is applied through inlet 126 to retract plunger 134 from template 116 and low pressure enters chamber 114 through inlet 142 thereby providing the air bearing. Work table 110 may now be rotated to the next index as determined by the holes in template 116. When plunger 134 has engaged the next hole in template 116 so that the work table 110 is properly positioned, chamber 114 is evacuated through inlet 142 and work table 110 is rigidly locked in position relative to base 100. After the work table 110 is locked, suitable operations may begin and the procedure of repositioning the work piece is repeated as previously described. The rotary table arrangement shown in FIGURE 4 adds simplicity, speed, and economy to operations on work pieces such as flanges that require bolt circles drilled. The vacuum lock takes all stresses of plunger 134 or plunger 40 of FIGURE 2 during the working operation.

Figure 5:
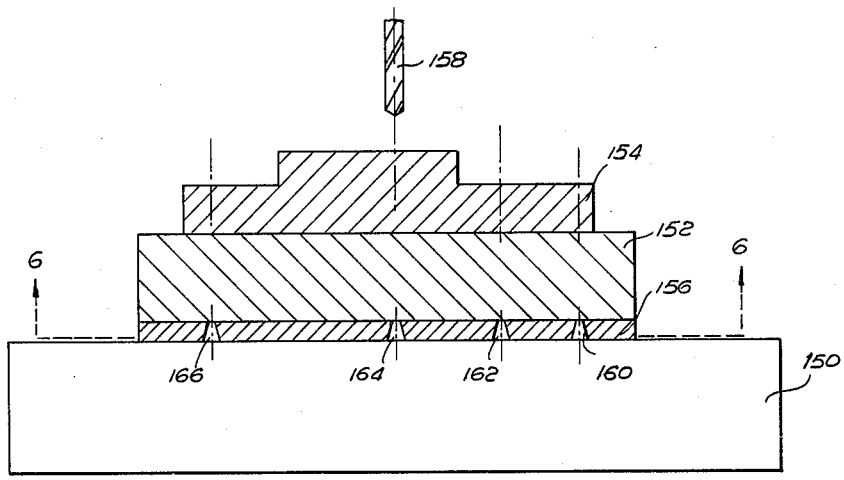
FIGURE 5 is a partial sectional, elevational view of a template arrangement showing another embodiment of the present invention.

FIGURE 5 is a partial cross-sectional, elevational view of an embodiment of the invention showing a base 150, a work table 152 and a work piece 154 mounted on work table 152. A suitable cutting tool such as a drill 158 also is shown in FIGURE 5. A template 156 is shown positioned under work table 152. Template 156 has a plurality of openings 160, 162, 164 and 166. These openings in template 156 are used for properly positioning the work table 152 relative to base 150 and the centerline of the drill.

Figure 6:
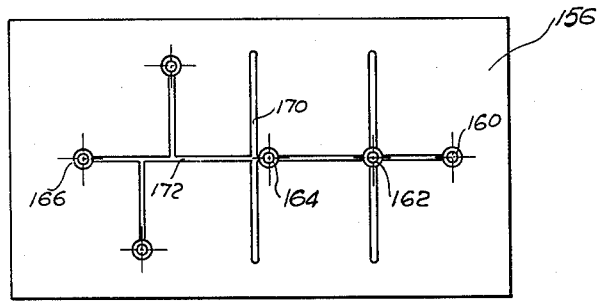
FIGURE 6 is a plan view of the bottom of the template shown in FIGURE 5, such plan view being taken along line 6—6 of FIGURE 5.

FIGURE 6 is a plan view taken along line 6—6 of FIGURE 5 showing the template 156 and apertures 160, 162, 164 and 166. A plurality of grooves such as 170 and 172 are provided on the template 156 to allow gas pressure to be applied over a substantial uniform area of the template so that the work table is not tilted when it is floating on the base.

FIGURE 7 is a plan view of an embodiment of the invention wherein a pantograph 200 couples work table 210 with base 212. A drawing board arrangement 214 is positioned below the upper surface of base 210. Drawing board 214 supports a drawing 216 or a suitable sheet of material having a layout of the hole pattern. One satisfactory sheet has been found to be black anodized aluminum or Mylar film. Sheet 216 contains a plurality of reference points such as reference point 218 and 220 and these reference points are sighted through a microscope 222 bringing work table 210 with work piece 230 in proper relationship with 212. Microscope 222 includes a crosshair reticle so that locations may be determined to a fraction of 1/1000 of an inch. Microscope 222 is coupled to the work table 210 through assembly 224. Thus, assembly 224 and a suitable sighting apparatus, such as a microscope 222 or projector provides optical means for locating particular points on the sheet 216 with such location being transferred to the work piece through the work table 210 and pantograph 200 arrangement. The purpose of the pantograph is to keep the X–Y axes of work table 210 to base 212 true.

FIGURE 8 is an elevational view of the arrangement shown in FIGURE 7. Pantograph 200 is shown coupled between base 212 and work table 210. Assembly 224 coupled to work table 210 has positioned on the end thereof suitable optical apparatus, such as microscope 222.

FIGURE 9 is an elevational view showing one of the upper flexible pantograph arms of pantograph 200. The flexible insert 232 such as flat spring steel is held between solid members 233. This construction prevents table 210 from tilting when it is floating on the air film.

FIGURE 10 is a plan view of an alternate arrangement of locating a work piece 250 on work table 260. Table 260 has diagonal T slots 262 and 264. These slots allow the work piece 250 to be nested when used with a square 266.

Thus, the invention provides an improved apparatus for positioning and locking a work piece preparatory to material removal and during such removal from the work piece. The apparatus for achieving the positioning and locking includes a source of gas pressure and a tied-in vacuum source. Although gas such as air has proven satisfactory it is conceivable that vapor might be used while practicing the invention. The vacuum source and the gas pressure are fed between the work table and base and the gas pressure is used to float the work table above the base during the positioning operation. After the correct position has been found, the vacuum source is used for locking the work table to the base as the gas pressure is reduced to zero. The present invention has several embodiments among which is an embodiment wherein a drawing board arrangement may be used to eliminate the need of a template which is used in practicing some of the embodiments of the present invention. The floating effect provided by the gas pressure is frictionless and allows heavy work pieces to be moved with only a touch of a worker's fingers. However, when the vacuum lock is provided the work table is fixed against any movement. The vacuum lock has further suitable application in the machine tool industry on machine tools of high accuracy such as jig borers where positive locking must be obtained without undesired shifting of cross slides or table slides during the locking action, thus having true position deviate from indicated position.

Although preferred embodiments of the invention have been shown and described, it will be apparent to one skilled in the machine art particularly and to others skilled in other arts in which the invention may be utilized that departures can be made from the shown and described embodiments without departing from the spirit of the invention. The invention is defined by the following claims and although such claims may be presented in indented format to facilitate reading and understanding thereof, such indented format is not to be construed a structural or functional limitations of the elements or steps recited in the claims.

I claim:

1. Apparatus for positioning a work piece, comprising, base means,
   a work table disposed adjacent said base means and adapted for receiving a work piece, the adjacent portions of said work table and said base means defining a pressure chamber,
   a source of gas pressure,
   conduit means communicating said source of gas pressure with said pressure chamber to provide a pneumatic bearing between the work table and the base means to permit movement of the work table relative to the base means,
   a vacuum source,
   conduit means communicating said vacuum source to said chamber operable to substitute a vacuum for gas pressure in said pressure chamber whereby to lock said work table to said base means, and
   indexing means for indexing the work table with respect to said base means, said indexing means including
   apertured template means and reciprocable indexing plunger means cooperably arranged on the work table and base means,
   a diaphragm chamber enclosing a portion of said plunger means,
   a diaphragm forming a flexible partition in said diaphragm chamber and connected to said plunger means,
   conduit means communicating a gas pressure source with said diaphragm chamber on the side of the diaphragm operable to urge said plunger means in a direction away from said template means,
   spring means biasing said plunger means toward said template means, and
   valve means for selectively controlling the several conduit means.

2. Apparatus for positioning a work piece, comprising, base means,
   a work table disposed adjacent said base means and adapted for receiving a work piece, the adjacent portions of said work table and said base means defining a pressure chamber,
   a source of gas pressure,
   conduit means communicating said source of gas pressure with said pressure chamber to provide a pneumatic bearing between the work table and the base means to permit movement of the work table relative to the base means,
   a vacuum source,
   conduit means communicating said vacuum source to said chamber operable to substitute a vacuum for gas pressure in said pressure chamber whereby to lock said work table to said base means, and
   indexing means for indexing the work table with respect to said base means, said indexing means including
   apertured template means and reciprocable indexing plunger means cooperably arranged on the work table and base means,
   a diaphragm chamber enclosing a portion of said plunger means,
   conduit means communicating a gas pressure source with said diaphragm chamber on the side of the diaphragm operable to urge said plunger means in a direction away from said template means,
   spring means biasing said plunger means toward said template means, and
   multi-position valve means for selectively controlling the several conduit means,
   said valve means being constructed and arranged in cooperation with said conduits to sequentially perform the following operations (a) communicating said gas pressure source simultaneously to both said pressure chamber and said diaphragm chamber, (b) evacuating said diaphragm chamber while maintaining gas pressure in said pressure chamber, and (c) evacuating said pressure chamber by communicating said vacuum source therewith.

3. Apparatus for positioning a work piece, comprising, base means,
   a work table disposed adjacent said base means and adapted for receiving a work piece,
   a source of gas pressure coupled to said base means to provide a pneumatic bearing between the work table and the base means to permit movement of the work table relative to the base means,
   a vacuum source coupled to said base means to substitute a vacuum for gas pressure between the work table and the base means whereby to lock the work table to the base means, and
   indexing means including plunger means operable by said gas pressure for indexing the work table with respect to said base means, said indexing means including apertured template means and reciprocable indexing plunger means cooperably arranged on the work table and base means,
   a diaphragm chamber enclosing a portion of said plunger means,
   a diaphragm forming a flexible partition in said diaphragm chamber and connected to said plunger means,
   conduit means communicating a gas pressure source with said diaphragm chamber on the side of the diaphragm operable to urge said plunger means in a direction away from said template means,
   spring means biasing said plunger means toward said template means, valve means for selectively controlling said gas pressure and vacuum to said base means and said chamber, and pantograph means operably connecting said work table to said base means to controllably limit the directions of movement of said work table relative to said base means.

4. Apparatus for positioning a work piece, comprising, base means, a work table disposed adjacent said base means and adapted for receiving a work piece, a source of gas pressure coupled to said base means to provide a pneumatic bearing between the work table and the base means to permit movement of the work table relative to the base means, a vacuum source coupled to said base means to substitute a vacuum for gas pressure between the work table and the base means whereby to lock the work table to the base means, and indexing means for indexing the work table with respect to said base means, said indexing means including, apertured template means and reciprocable plunger means cooperably arranged on the work table and base means, said plunger means including flexible diaphragm means responsive to said gas pressure to move the plunger in a direction away from said template means, spring means biasing said plunger means toward said template means, and pantograph means operably connecting said work table to said base means to controllably limit the directions of movement of said work table relative to said base means.

References Cited by the Examiner

UNITED STATES PATENTS

| | | | |
|---|---|---|---|
| 2,807,180 | 9/57 | Adams | 51—235 X |
| 2,874,599 | 2/59 | Charlot | 77—64 |
| 2,885,915 | 5/59 | Schurger | 77—64 |
| 3,126,768 | 3/64 | Gondek | 77—64 |

FOREIGN PATENTS

| | | |
|---|---|---|
| 778,801 | 7/57 | Great Britain. |
| 122,385 | 11/58 | Russia. |

WILLIAM W. DYER, Jr., *Primary Examiner.*